Dec. 5, 1950 R. J. HERBOLD 2,532,402
NAVIGATING INSTRUMENT FOR CRAFT AND PILOT GUIDANCE
Filed March 15, 1947 4 Sheets-Sheet 2

Dec. 5, 1950           R. J. HERBOLD           2,532,402
NAVIGATING INSTRUMENT FOR CRAFT AND PILOT GUIDANCE
Filed March 15, 1947           4 Sheets-Sheet 3

Inventor
Robert J. Herbold
By Clayton R. Jenks
Attorney

Dec. 5, 1950     R. J. HERBOLD     2,532,402
NAVIGATING INSTRUMENT FOR CRAFT AND PILOT GUIDANCE
Filed March 15, 1947     4 Sheets—Sheet 4

Inventor
Robert J. Herbold
By Clayton P. Jenks
Attorney

Patented Dec. 5, 1950

2,532,402

UNITED STATES PATENT OFFICE 2,532,402

NAVIGATING INSTRUMENT FOR CRAFT AND PILOT GUIDANCE

Robert J. Herbold, Denver, Colo., assignor to Lafayette M. Hughes, Denver, Colo.

Application March 15, 1947, Serial No. 735,030

23 Claims. (Cl. 318—489)

This invention relates to a navigation instrument, and more particularly to an instrument which automatically determines the position of a craft relative to a charted course and guides the craft or its pilot to a plotted destination.

Various instruments have been proposed heretofore to determine latitude and longitude of position, and thus to provide indicating data which inform the pilot as to the craft location so that he may determine his future course. It is, however, desirable, for the guidance of various types of craft, that its position relative to a plotted course be determined automatically and without requiring that a pilot calculate his position relative to the course and guide the craft in accordance with his own judgment. In the control of an aircraft which travels at a very high speed any mistake in judgement by a pilot can throw the craft seriously off course. Hence, it is further desirable that a craft be guided automatically, either all of the time or at the will of an operator, so that it will travel according to a plotted course and towards a destination of known location on the earth.

The primary object of this invention is to satisfy such ends and provide an instrument which will automatically determine the position of the moving craft relative to a course plotted on a chart.

Another object is to provide a navigation instrument in which latitude and longitude determinations are made by ascertaining the position of the craft relative to a plotted course.

A further object is to provide a device which automatically maintains a celestial fix for determining both latitude and longitude of position and which will automatically indicate the craft position relative to a predetermined course.

Another object is to provide such an automatic apparatus which will guide the craft from an off course position to one in which it remains substantially on course.

A further object is to provide an instrument capable of controlling craft guidance which causes the craft to follow automatically a course plotted according to latitude and longitude and wherein only the destination of the craft needs to be accurately plotted.

Another object is to provide electronic apparatus activated by a ray of light from a celestial fix which governs the determination of craft position and the automatic guidance of the craft. Further objects will be apparent in the following disclosure.

In accordance with my invention, I have provided an electronic device controlled by radiant energy from a celestial body which is automatically movable to maintain a fix thereon. The differential movements of the device or resultant varied conditions caused by the craft travelling relative to the earth's latitude and longitude gives an instantaneous indication of craft position with reference to a plotted destination and a course thereto. Mechanism controlled by any deviation of the indicated course from the plotted course governs the craft guidance apparatus.

A preferred construction comprises a chart having a desired destination plotted in corrected latitude and longitude angles and a course thereto. The chart may be a sphere, or a segment of one, mounted to rotate in the direction and at the angular rate of apparent movement of a celestial body, such as the sun, on which a fix is maintained automatically by a light seeking electronic device. A course follower is moved automatically over this chart by mechanism controlled by movement of the light seeking device or a variation of conditions in governing electric circuits, as is required to maintain the fix, and any movement of the follower off the plotted course governs further electronic apparatus that serves to control the craft guidance apparatus automatically so as to minimize any deviation from the intended course.

Referring to the drawings illustrating a preferred embodiment of the invention.

Figures 1, 7:
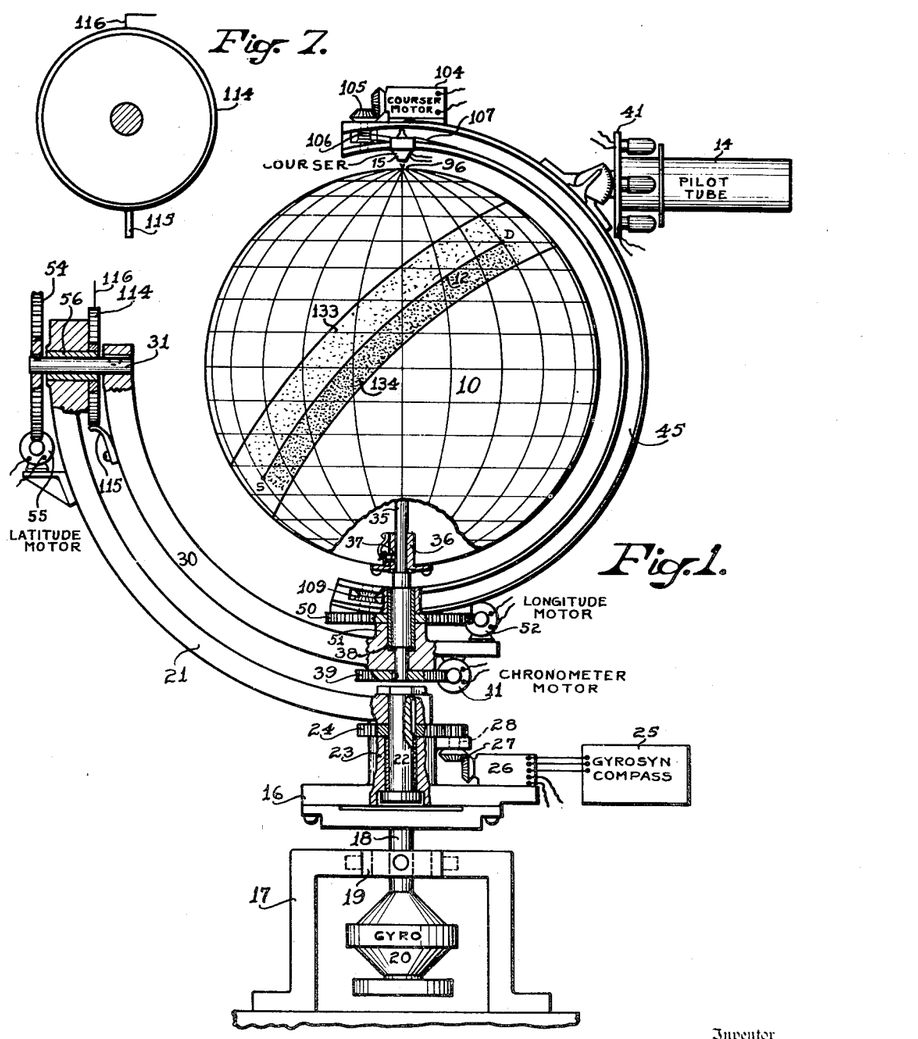
Fig. 1 is a vertical elevation, partly in section, of the apparatus as it would appear at the north pole.
Fig. 7 is a plan view of the resistance element 114.

The preferred form of this device, as shown in Fig. 1, comprises a sphere 10 or a chart surface segment simulating the earth or a surface portion thereof, which is gyroscopically mounted and positionally controlled so that its axis is held in a definite relation to or parallel with the earth's axis. This sphere 10 is mounted to be rotated by a chronometer mechanism 11 at the angular rate of rotation of the earth or according to celestial time and in the direction of apparent movement across the sky of a celestial body which serves as an astronomical fix from which latitude and longitude positions of the craft are determined.

A course for the craft relative to the earth may be simulated by a course 12 plotted on the chart, whose terminals or other points are determined by latitude and longitude angles corrected for magnetic declination or other errors. The craft is guided by reference to such a plotted course. The latitude of the craft's position relative to the earth is ascertained continuously by an electronic device comprising a pilot or light tube 14 which automatically maintains a fix on a celestial body, such as the sun or a star or group of stars, and governs electrical mechanism that in turn causes a course follower 15 to move automatically with a change in craft latitude and longitude and indicate the craft position on the chart. Further electrical mechanism controlled by the position of the course follower relative to the plotted course serves to control the craft rudder and cause the craft to follow the plotted course. Indicating mechanism governed automatically by the mechanism also serves to advise the craft pilot and navigator as to the craft position at all times.

*Sphere mounting*

The surface of the sphere 10 is shown as provided with latitude and longitude lines and it may, if desired, be provided with a map, the longitude lines and map being reversed east to west. The sphere is suitably mounted on a support stabilized against craft movement. To this end, it is supported by a base 16 which is universally mounted on a bracket 17 on the craft. This base 16 is mounted on the top of a vertically depending rod 18 pivoted on a gimbal ring 19 which is in turn pivoted at 90° thereto within a ring at the top of the bracket. The base is stabilized by suitable remote control mechanism or directly by a gyroscope 20 carried on the bottom of the rod 18 supported by the gimbal rings, so that the sphere axis is not affected by lateral craft movement.

The sphere is further mounted for universal movement relative to its support 16 so that the sphere axis may be tilted into parallelism with the earth axis. This mount comprises a vertically extending quadrant arm 21 keyed at its lower end on a shaft 22 mounted for rotation through 360° about a vertical axis which preferably coincides with the vertical North and South Pole axis of the sphere 10. The shaft 22 is vertically mounted in suitable bearings in a boss 23 on the base 16. The shaft is secured in position by means of a head on its lower end and a nut threaded on the upper end. A gear 24 is likewise keyed to the shaft 22 beneath the quadrant arm 21, and it serves as a thrust member bearing on the top of the boss to support the arm 21.

In order to hold the sphere axis in a north and south plane, the quadrant arm 21 is gyroscopically held in an east and west direction. This is accomplished by means of a suitable compass connected to the arm by a remote or a direct control mechanism. This preferably comprises a Sperry "Gyrosyn" self-synchronizing gyroscopic compass 25 which includes a horizontal flux valve that detects magnetic lines of force of the earth's field and seeks a magnetic north and south direction. The direction sensed by the compass is transmitted electrically through a power amplifier and a Selsyn or servomotor 26 connected through gear 27 to apply torque to a short vertical shaft 28 carried by the boss 23 and geared to the gear 24 on arm 21. The high speed gyro is the rotor of a 3 phase induction motor, and a variable transformer pick-off detects angular movements of the arm 21 relative to the gyro and the servomotor 26 responds to stabilize the quadrant arm 21 and hold it in a proper position. This type of compass and servo control is not affected by tilting and pitching of the craft; and the gyro compass may be installed in any suitable location relative to the sphere.

The upper end of the quadrant arm 21 carries a further quadrant arm 30 which is arranged to rotate about a horizontal axis passing through the center of sphere 10 which is provided by the pivot shaft 31 suitably mounted in a bearing on the upper end of the quadrant arm 21. The quadrant arm 30, which is keyed to the shaft 31, may swing through an arc of 360°, while the arm 21 is oriented and thereafter held stationary in an east and west direction. Thus the polar axis of the sphere 10 swings in a north and south plane when controlled by the gyro compass.

The sphere 10 is mounted on a polar rod or shaft 35 and connected thereto through a suitable friction clutch so arranged that the sphere 10 may be rotated relative to the rod when corrections are to be made for longitude. This clutch may comprise a boss 36 secured to the outside of the sphere and which carries a spring pressed driver or plug 37 held frictionally against the shaft 35, so that the latter normally drives the sphere when rotated. The lower end of the polar shaft 35 is rotatably mounted in a bearing sleeve 38 within the quadrant arm 30, which is arranged at an angle of 90° to the axis of the shaft 31, so that the sphere may be rotated like the earth about its polar axis while the latter is held in a north and south plane through the earth axis.

The sphere 10 is rotated about its polar axis relative to the quadrant arm 30 by the chronometer mechanism 11 mounted on the under side of the swinging arm 30. The chronometer comprises any suitable mechanical or electrical clock mechanism of required characteristics, such as a 24 hour solar clock. A worm on the chronometer shaft, or a servo or Selsyn motor controlled by a clock, drives a worm gear 39 pinned on the lower reduced end of the polar shaft 35 that projects below the quadrant arm 30. The gear 39 and associated parts hold the sphere in place for any angular position thereof. By this means, the sphere 10 may be rotated at the rate of one revolution per solar day or sidereally at the apparent rate of star movement and in the direction of the apparent movement of the sun from east to west.

Pilot tube orientation

Figures 2, 4:
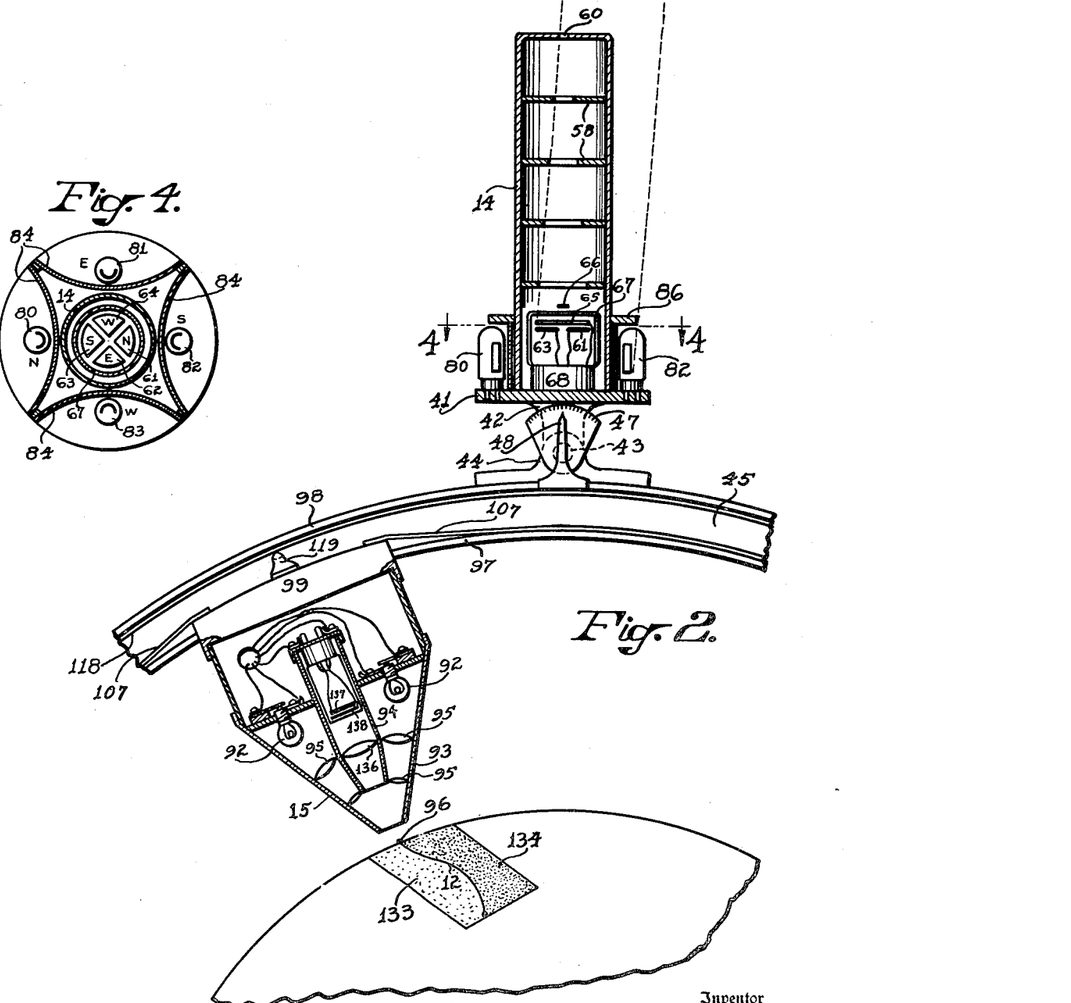
Fig. 2 is an enlarged sectional fragmentary view showing the light pick-up and the course follower associated with the sphere.
Fig. 4 is a sectional view on the line 4—4 of the Fig. 2.
Figure 3:
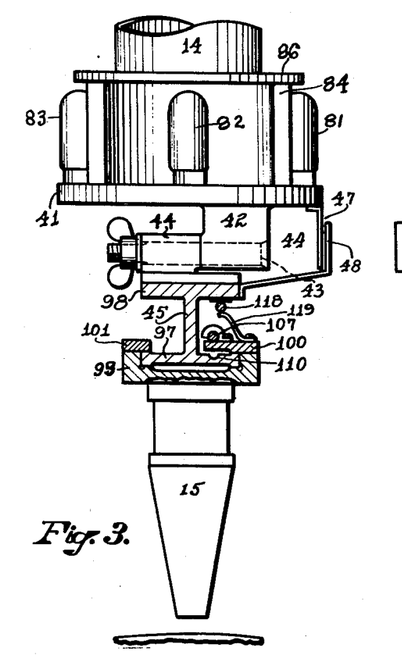
Fig. 3 is an enlarged fragmentary elevation of the courser and part of the light tube taken at right angles to the view of Fig. 2.
Figure 5:
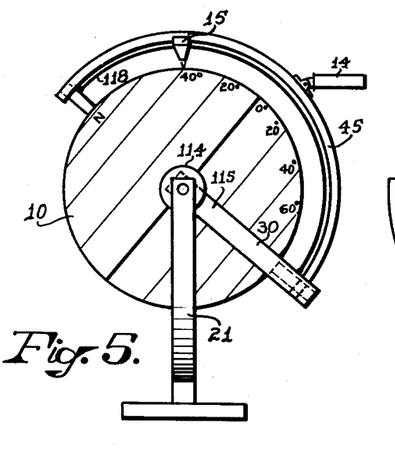
Fig. 5 is a diagrammatic perspective view taken at right angles to Fig. 1 showing the arrangement of the electrical contacts when the craft is at about 40° N. latitude.
Figure 6:
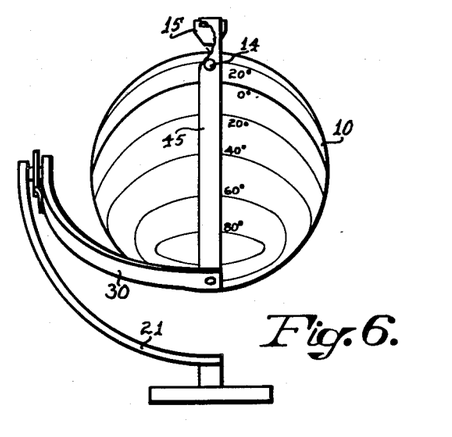
Fig. 6 is a similar view taken at right angles to Fig. 5.

The craft position at any instant is determined by reference to the north south axis of the sphere 10 and to a solar or sidereal fix. This fix is obtained by a light seeking electronic device arranged in the cylindrical light tube 14 (see Figs. 2 and 3). The tube is mounted on a base 41 which has a downwardly projecting lug 42 pivoted on the bearing pin 43 secured in a bracket 44 on the arm 45. The arm 45 is shaped as an arc which spans over 180° of the sphere 10 and intersects the north and south pole axis thereof. It is arranged to be swung about the pole axis through the entire 360°, so that the light tube 14 mounted thereon may follow the sun from any position of the craft relative to the earth.

Since the declination of the sun varies during the year, the light tube is angularly adjusted and preferably manually to an angle determined by the protractor 47 mounted to swing with the light tube 14 and a fixed pointer 48 mounted on the arm 45, so that once the declination of the sun has been determined from astronomical tables the tube may be tilted to the correct angle to pick up the sun, provided the sphere axis is tilted into parallelism with the earth axis and according to the angle of latitude of the craft. Thus the pilot or light tube 14 may be set to follow the sun from sunrise to sunset provided the polar axis of the sphere 10 is parallel with the earth's axis.

The arm 45 and the pilot tube thereon are swung freely about the north and south polar shaft 35 of the sphere 10 by electrically controlled mechanism which is in turn governed by light detector photocells within the tube 14. To this end, the semi-circular arm 45 is keyed at its lower end (Fig. 1) to the bearing sleeve 38 which is rotatable relative to the polar rod 35. A gear 50, which bears on a hub 51 on arm 30, is suitably secured to and supports the under side of the arm 45. The gear is keyed to the bearing sleeve 38 and is concentric therewith. It is arranged to be driven by a reversible electric servo or Selsyn motor 52 mounted on the extended end of the quadrant 30. This motor is controlled to swing the half circle arm 45 at the apparent rate of sun or star movement. Thus, if the quadrant arm 21 has been oriented to an east and west position and the quadrant arm 30 has been swung to hold the sphere axis parallel with the earth's axis and in a north and south plane, then the motor 52 can be operated to cause the light detecting pilot tube 14 to maintain a fix on the sun. Since the light detector mechanism swings with the arm 45 to a definite longitudinal position in order to pick up the sun, this position of the arm 45 relative to the rotating sphere 10 gives the craft longitude, provided the arm was set initially over the correct longitude of the starting point for the craft.

If the sphere axis is tilted in a north and south axial plane to cause the latitude line on the sphere, which indicates the craft position, to pass through the top point or zenith of the sphere, then the sphere axis is parallel with the earth axis. The latitude of the craft position is automatically determined by an electrical control mechanism that swings the quadrant arm 30 to a position parallel with the earth axis, where the light tube may pick up the sun when arm 45 is swung to the correct angle, provided the tube has been tilted according to the declination of the sun for that day. This swinging movement of arm 30 is effected by means of a helical gear 54 (Fig. 1) keyed to the short shaft 31 that carries and is keyed to the upper end of the quadrant arm 30. This gear 54 is suitably driven by a gear on the shaft of a Selsyn, servo or other reversible electric motor 55 mounted on the side of the quadrant arm 21. A bearing sleeve 56 fixed in a horizontal opening in the quadrant arm 21 rotatably supports the shaft 31 with its axis in the equatorial plane of the sphere.

Electronic control of pilot tube

The light tube 14 comprises a hollow cylinder which is preferably blackened on the inside and may be provided with annular baffles 58 (Fig. 2) to cut down the ambient light. The tube has its outer end closed except for a central circular aperture 60 through which sunlight or starlight may enter. This light is intended to activate one or two of the four suitably constructed photosensitive elements 61, 62, 63, 64 (Figs. 2 and 4) provided the light ray is nearly central of the tube. These elements are preferably flat cathode plates associated with a ring shaped anode 65. The cathodes are arranged in the four quadrants, north, east, south and west, and they are spaced to provide a circular non-sensitive space therebetween. A disk 66 of opaque metal is preferably mounted centrally of the tube (Fig. 2) above the space between the cathodes, so that if the sun ray is exactly central, it does not project into the space between the cathode plates; but if the light ray moves slightly to one side, then it will strike one of the plates and activate the same. The photocell may be photoconductive, voltaic or emissive. It is here shown as a photoemissive cell of standard construction protected by a glass envelope 67 and mounted on a base 68 provided with the usual contact prongs for making the desired connections.

Figure 8:
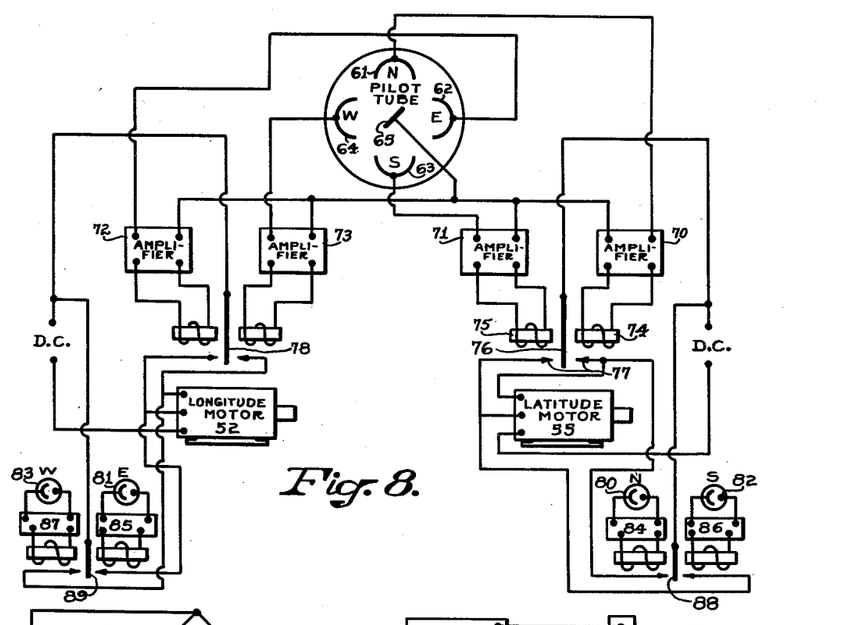
Fig. 8 is a wiring diagram of the circuits for orientation of the light pick-up.
Figure 11:
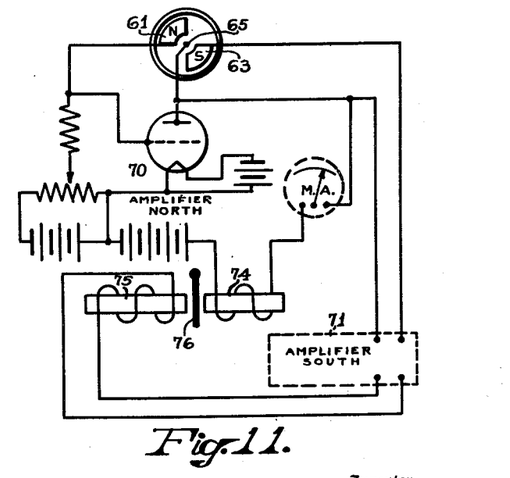
Fig. 11 is a partial wiring diagram of an amplifier circuit controlled by a light seeking electronic cell.

Referring to Fig. 8, the north cathode 61, activated by light from a northerly angle, is connected through an amplifier circuit 70 of standard construction to the anode 65. The amplifier circuit (Fig. 11) may be made through a suitable pentode or other electronic tube and the energizing A, B and C batteries in circuit with a milliammeter, or it may be otherwise arranged as desired. Similarly, the south light activated cathode 63 and anode 65 are connected through an amplifier 71; and the east and west light activated cathodes 62 and 64 connect with the anode through amplifiers 72 and 73. The north and south amplifiers 70 and 71 are connected with the two separate coils 74 and 75 of a double throw single pole relay having a movable contact arm 76 adapted to make a contact with one or the other of two terminals 77 of a reversible north and south direct current latitude motor 55 (Fig. 1) which swings the latitude adjusting quadrant arm 30. Similarly, the east and west amplifier systems 72 and 73 are connected to the coils of a relay 78 to control the east and west reversible direct current longitude motor 52 (Fig. 1) which swings the half circle arm 45 that is to be moved according to a variation in longitude. Each amplifier circuit may be of the type shown for the north cathode in Fig. 11.

Thus, if the sun enters the light tube 14 and strikes only the north cathode 61, it causes the reversible latitude motor 55 to move in such a direction as to swing the tube towards a centralizing position for the sun ray. If the sun light hits the opposing south cathode 63, then the motor is rotated in the opposite direction. Similarly, the east and west cathodes 62 and 64 operate through the reversible longitude motor 52 to swing the semi-circular arm 45 east or west relative to the meridians of the sphere 10, so as to cause the arm 45 to move with the sun and hold the light tube 14 in alignment with the sunlight as the sun travels west. If the craft is steady relative to a latitude line, or travels east and west, the quadrant arm 30 remains steady and the axis of the sphere 10 is not tilted, and the only motion is that of the longitude arm 45 which causes the light tube to follow the sun. If the craft moves in any other direction, whether to the north or the south, then both arms swing to keep the sphere axis tilted at the correct angle and the light tube fixed on the sun as it moves through the sky in an apparent east to west motion.

This construction may be employed to indicate latitude and longitude directly, since the sphere 10 will be held with its axis so positioned that the latitude line passing through the craft position will also pass through a zenith or top point of the sphere 10; hence a plumb bob suspended above the sphere to indicate the exact top point will indicate the latitude of the craft relative to the earth, subject to correction for magnetic declination.

The longitude of the craft relative to the earth may be determined by noting the meridian line intersected by the center line of the pilot tube 14. The arm 45 may have a central slot so located that the sunlight may pass through it to the sphere 10, and this indication of longitude may be used to guide a pilot in the manual control of a craft whether on the water or in the air.

In order to bring the light tube 14 initially into alignment with the sun rays from any position, I provide a suitable electrical hunting mechanism shown in Figs. 2, 3, 4 and 8. A preferred construction comprises the four photo-emissive cells 80, 81, 82 and 83 of standard construction arranged outside of and around the pilot tube and 90° apart. These are separated from one another by the arcuate opaque light shields 84 which are so arranged that each tube is free to receive light mainly from a sector having an angle less than 180°, so that east light will affect primarily the east tube 81, while northeast light will strike the north and east tubes 80 and 81 but not the others. An annular shield 86 located above the cells and around the tube 14 serves to prevent activation of the photocells when light enters the aperture 60 and activates the interior photocells therein. Thus the inner cells take over the control when the hunting action aligns the tube with the sun.

These hunting tubes 80, 81, 82 and 83 (Fig. 8) connect respectively through suitable amplifying apparatus 84, 85, 86 and 87 with the coils of two double pole single throw relays 88 and 89, as illustrated. The left hand coil of the relay 88 is energized through its amplifying system when the photocell 80 is activated by north light. The other coil of this same relay is connected through amplifier 86 with the light tube 82 that receives the south light. Similarly, the other relay 89 has its coils connected respectively through the amplifiers with the photo tubes 81 and 83 which receive the east and west lights.

These light hunting cell circuits are connected with the two motors that are actuated by the cells within the pilot tube 14. That is, the east and west hunting system connects with longitude motor 52 that varies the longitude position of the half circle arm 45, so that an east light activation swings the pilot tube 14 towards the west, for example. North and east light activation of the corresponding cells moves the pilot tube generally towards the southwest. That is, the motor moves the tube 14 away from activation of the hunting cells that are illuminated. The other hunting system activated by the north and south light is connected with the latitude motor 55 that swings the quadrant arm 30 to make a latitude variation. Thus, the hunting photocells outside of the pilot tube 14 will serve to pull the light tube over to a position where the light ray no longer activates the hunting cells differentially and may now pass through the aperture 60 to activate one of the cathodes 61, 62, 63 and 64 and give a precise control of the pilot tube 14. After the inner cells take control of the pilot tube, then the extraneous light striking the outside cells is immaterial. If desired, various other shield and cell arrangements may be provided to attain the proper hunting action. The photocells inside of the tube 14 do not take control of the movement of the pilot tube until they are activated by a direct ray of sunlight; and the amplifiers are regulated in accordance with the desired light intensity for proper operation of the relays.

Course follower

The position of the craft relative to the earth is indicated on the pilot sphere 10 by a course follower 15 which is slidably mounted on the half circle arm 45. The courser gives a direct indication of craft position; but for automatic craft guidance, it is arranged to direct a spot of light on the sphere at the latitude and longitude corresponding with the actual position of the craft. This courser 15 preferably includes a self-contained light system. The light spot may be derived from one or several electric light bulbs 92 (Fig. 2) arranged annularly inside an opaque casing or light shield 93 shaped as a frustum of a cone. An internal annular shield 94 serves to confine the light rays to a ring shaped space between the two shields. A suitable lens and diaphragm system 95 is arranged within the annular space to condense the light from each of the bulbs 92 and focus it as a fine point of light 93 on the surface of the sphere 10.

The light spot 96 is guided across the surface of the pilot sphere 10 to give a latitude and longitude determination by means of an electrically controlled mechanism which swings the arm 45 and moves the courser 15 along the arm. The half circle arm 45 is shaped as an I-beam (Fig. 3) with its inner and outer flanges 97 and 98 concentric with the pilot sphere. The arm 45 is free at its outer north pole end, since it is supported only by the rotatable sleeve 38, and it does not interfere with a 180° movement of the courser. The top plate 99 of the courser (Fig. 3) has short flanges 100 and 101 which are shaped to slide freely along the inner flange of the I-beam.

The courser may be moved along its arcuate path by a suitable mechanism, such as a rack and pinion or a cable drive, moved by an electric motor. This may comprise a reversible electric motor 104 (Fig. 1) mounted on the upper free end of the swinging half circle arm 45. The motor has its shaft connected through suitable bevel gears 105 with a drum or pulley 106 around which a few turns of cable 107 are wrapped. This pulley is mounted on a pivotal pin suitably carried by the two flanges 97 and 98 of the arm 45 and arranged radially of the sphere. A second pulley 109 is radially mounted on the opposite lower end of the arm 45 (Fig. 1). These two winding pulleys are located on the ends of the arm 45 which project beyond the pivotal axis of the sphere so as to permit a full 180° movement of the courser. Except where attached to the courser, the cable 107 slides in a groove 110 (Fig. 3) on the surface of the inner supporting flange 97. The cable passes around the two pulleys and its ends are clamped to the flange 100 of the courser. Thus, the cable is endless and the reversible motor 104, when energized, will move the courser along its arcuate support to position the light spot 96 according to the latitude of the craft.

Electrical control of courser

Figure 9:
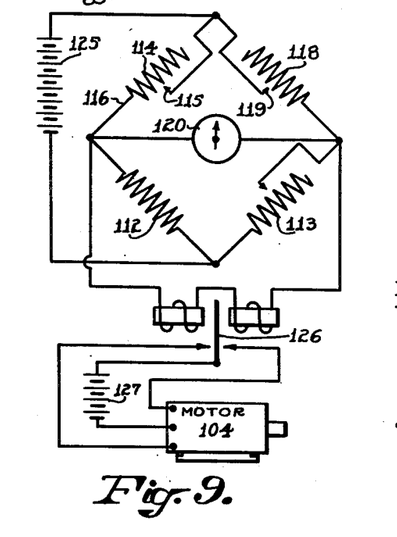
Fig. 9 is a wiring diagram of the bridge and electrical apparatus controlled thereby which moves the course follower automatically in relation to latitude.

The direct current reversible motor 104 that governs the courser is controlled by an electric circuit as shown in the wiring diagram of Fig. 9. This electrical system comprises a Wheatstone bridge having a standard resistance 112 in one arm and an adjustable resistance 113 in the other arm to balance the same. The third resistance 114 of that bridge is shaped as a helical coil (Fig. 7) or other suitable resistance arranged as a circle on the top of the arcuate arm 21 and concentric with the pivot 31. The lead wire 116 connects suitably to this resistance. A contact arm 115, arranged to wipe over the exposed surfaces of the insulated convolutions of this resistance coil, is mounted on the swinging quadrant arm 30, so that when the latitude control motor 55 is actuated to swing the arm 30 and tilt the sphere axis, the contact 115 moves to a definite position on the resistance which is related to the latitude of the craft. If the arms 21 and 30 are parallel, as shown in Fig. 1, and the courser 15 is at the top of arm 45, then the contact arm 115 is 180° from the lead wire 116 (Fig. 7) and all of the resistance is cut in. Any further tilting of the arm carrying contact 115 decreases one arm of the circular resistance, so that the courser may travel only 180° and must retrace its course as the sphere is tilted more than 180°. The courser is to be located at that angle from the pole of the sphere which is the same as the angle between arms 21 and 30.

The fourth resistance 118 is a wire (Figs. 2, 3, 5 and 9) mounted on the inside of the outer flange 98 of the arm 45; and its exposed contact surface is wiped by a contact arm 119 fixed on flange 100 of the courser. The effective resistances of the coil 114 and the wire 118 are the same; and the bridge is to be balanced, as shown by a galvanometer 120, so that the portions of the two resistances 114 and 118 in the circuit shall be equal. That is, the angle which the arcuate support 30 carrying contact 115 makes with a horizontal plane through the axis of pin 31 on the fixed arm 21 represents the angle of latitude of the craft position; and the courser 15 is to be moved along the arm 45 until its position is such that the contact 119 on wire 118 marks off that same latitude angle from the sphere's equator. If arm 30 is vertical, the courser will be at the north pole, and each resistance is fully cut in, as shown in Figs. 1 and 7, or each may be fully cut out if desired. The wiper or contact arm 119 which moves along the wire 118 may be electrically connected to the arm 45 (Fig. 2), which in turn is suitably connected with contact arm 115 that moves over the adjustable resistance 114 on the arm 21, such as through the arm 30. That is, the outer or north pole end of wire 118 is insulated, and the south pole end of the wire is connected to the variable contact of resistance 113 (Fig. 9) and the two contacts 115 and 119 are connected.

A suitable battery 125 (Fig. 9) or other D. C. power supply provides current for the bridge, and any unbalance in this bridge moves the swinging arm 126 of a double throw polarized relay (Fig. 9) in one direction or the other to reverse the current flow in the circuit of a battery 127 that actuates the motor 104 and moves the courser in a direction determined by the position of the contact arm 126 of the relay. The circuits are such that movement of the arm 30 to an angle of 40° with a horizontal plane through axis 31 causes the courser 15 to move to that latitude line of 40° N. When the craft moves northerly towards the pole the arm 30 swings down towards a vertical position and ultimately all of resistance 114 is cut in. At the same time, all of resistance 118 is cut in.

When the craft passes over the north pole and proceeds south, the courser 15 must retrace its course to indicate a lower latitude. That is, as the arm 30 swings past a vertical position, the contact 115 moves to reduce the resistance in one arm of the circular coil 114 and resistance is now being cut out. This causes the courser to move south relative to the sphere. Any change in latitude of the craft carrying the instrument, disregarding any east and west movement, will unbalance the bridge and cause the motor 104 to run in that direction which moves the courser to balance the bridge, and this proceeds automatically until the craft reaches its destination. Hence the contact arm 119 is in a position corresponding with the location of contact arm 115 on the other bridge arm, so that these two bridge arms remain in circuits having equal resistances. When the bridge is in balance, the spring centered contact arm 126 of the relay swings to a neutral position, and the motor 104 is inactive until a material change in latitude position occurs. Any inaccuracy in the tension of the cable and such is not important, since the courser must move to a point where the bridge is balanced. When the craft crosses the equator going south, the courser contact 119 merely passes the 90° or half-way point and cuts out more resistance until the craft reaches the south pole where there is no resistance in that arm of the bridge circuit. The same condition applies to the resistance 114, except that the contact 115 crosses the intersection 128 (Fig. 7) between the two semi-circular coils 114 and proceeds along the other resistance wire.

Craft guidance mechanism

Insofar as above explained, the mechanism may be used for the guidance of the pilot or the navigator who manually controls the craft, since he is now informed by the light spot 96 on the sphere as to his exact location relative to the earth. If his course 12 has been plotted on the surface of the sphere 10, as shown in Fig. 1, then it is merely necessary for him to so steer the craft that the light spot 96 follows the course. This requires merely an accurate predetermination of the latitude and longitude of key points and no map is needed; but if a map is used, it should be reversed from east to west to correct for the fact that the rotation of the earth is the opposite of the apparent motion of the sun or other celestial fix. If the plotting of course 12 on the sphere has been accurately done and with due allowance for errors in the control instruments, such as the errors of a magnetic gyro compass which does not point to the true north, but only to the magnetic north, then the pilot may travel on course. If the end point of the course has been accurately plotted, it is immaterial as to whether or not the craft has followed exactly the course line 12. When the spot light 96 reaches that end point on the sphere, the craft has reached its destination, except for permissible location errors. Hence the craft guidance becomes increasingly accurate as the destination is approached.

Figure 10:
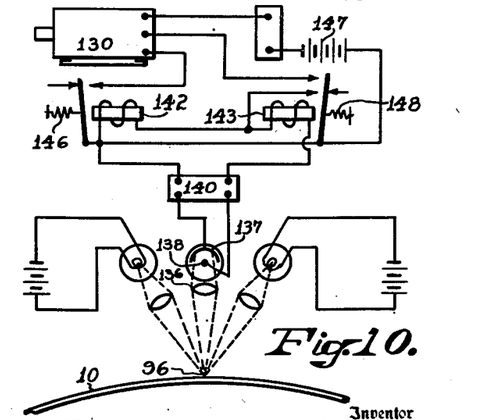
Fig. 10 is a wiring diagram of the electronic apparatus controlled by the course follower which operates the craft guidance mechanism.

This apparatus is, however, constructed to control the guidance of the craft automatically, such as where one or more rudders of the craft may be operated electrically under the control of a reversible electrical motor 130 (Fig. 10). This motor is preferably connected through a Selsyn or servomotor system which governs a powerful motor capable of operating and holding the craft rudder in a desired position, as will be understood. The rudder is controlled to move through a predetermined arc to such a position that the craft is slowly brought on course if it has deviated therefrom.

This control is effected by an electronic apparatus shown primarily in Fig. 10, in which the spot light 96 is employed not only to give an indication whether the craft is on course but to cause it to return to the correct course as determined by the plotted line. This is accomplished without computation of latitude and longitude and without actual knowledge of the craft's position at any instant. The course line 12 may be plotted on the sphere 10 or a segment thereof as a division line between two surfaces 133 and 134 (Figs. 1 and 2) which have definite differences in light reflection. The surface 133 may be of high reflectivity and the surface 134 may be of medium or low reflectivity, but not of full light absorption. The strip 133 may be a metal having a polished mirror surface, and the strip 134 may be a metal having a duller or matt surface which reflects about half as much light as does the polished mirror 133. These surfaces are intended to govern electronic apparatus which is activated differentially by the different light intensities reflected by the two surfaces. The line 12 may be a black, light absorptive line having the effective width of the light spot 96, so that there is no reflection if the craft is on course and the light spot 96 rests only on the black line.

The light spot 96 is employed to control electronic apparatus by being reflected back through a lens 136 (Figs. 2 and 10) located inside of the courser 15 and within the light annulus that forms the spot 96. The reflected light collected by the lens 136, which may be a suitable optical construction, activates the cathode 137 or the sensitized surface of a photocell mounted within the courser. This cell may be of the photoemissive, conductive or voltaic type. As shown in Fig. 10, it comprises an anode 138 connected with the cathode through a suitable battery and amplifier system 140 and with a double relay system arranged to control the direction of rotation of the reversing direct current electric motor 130 that governs the rudders or a further rudder control motor which controls the lateral guidance of the craft.

This system comprises one relay 142 which is controlled by the light spot 96 striking the lesser reflective light surface 134, while the other relay 143 is governed by the movement of the light spot to the more highly reflective surface 133. Each relay has its contact arm resting in an open position when the light spot 96 strikes only the black course line 12, which has such a high absorption that not enough light is reflected back to activate the selected photocell. The line 12 has the same width as the light spot 96. The spring 146 which holds the contact arm of relay 142 open is so adjusted that the relay arm closes when the light spot 96 moves to illuminate the strip 134 of low reflectivity. That is, the amplified current is strong enough to move the contact arm of the relay 142. At that time, the circuit will be so made that the motor 130, which is driven by a battery 147 or other suitable source of power, is rotated in such a direction as to cause the rudder to be so moved as to swing the craft back to that position where the light spot will again fall wholly on the line 12. The spring 148 of the other relay 143, which causes rotation of the motor 130 in the opposite direction, has such strength that the contact arm of the relay will close its circuit to the motor when the light spot 96 strikes the highly reflective surface 133. When this relay closes, it will be at the same short circuit the coil of the other relay 142. But when the darker surface 134 is activated, the spring 148 is so strong that this relay 143 cannot be actuated by the current provided by the amplifier circuit 140. On the other hand, when the light hits the highly reflective surface 133 there is such a high activation of the photocell cathode 137 that a large amount of current is developed sufficient to close the circuit of relay 143 against its strong spring 148. Thus, this differential relay serves to reverse the current from battery 147 to the motor 130 as required to bring the craft back to and keep it on course.

The electronic devices of the various parts of the apparatus may be made and arranged in accordance with standard practice. The photocells of the pilot tube, both inside and out, are to be particularly sensitive to infrared light because of the necessity for picking up a celestial body during a stormy period. For example, I may use an argon gas filled photoemissive tube having a cathode of caesium on caesium oxide applied to a base of silver for activation by the rays from the sun. For a photovoltaic cell, I may use a copper oxide or photronic cell. A resistance cell may be of the selenium type, or I may use a thalofide cell having a platinum disk provided with a coating of thallium metal sensitized by oxygen and sulfur. Molybdenum sulfide is sensitive to infrared and may be employed. Various types of thermocouples may be employed. The term "light" as used herein applies to any electromagnetic wave or radiant energy derived from a celestial body and particularly the light within the range of the infrared and ultraviolet portions of the spectrum which will serve to maintain the required fix.

*Operation*

If it is desired to fly eastwardly from Denver, Colorado, located at approximately 40° N. latitude, 105° west longitude, to Capetown, South Africa, located at approximately 33° south latitude and 19° east longitude (see D and S on Fig. 1), it is merely necessary to plot accurately on the sphere the exact positions of the two end points, or at least the destination, and then draw a great circle or other line 12 between these points. The longitude lines are reversed, so that S is east of D on the sphere. That line may be made of any desired shape, such as where it is wished to avoid certain locations, such as storm centers or cities, or to fly over others en route. Then two strips 133 and 134 of required light reflective properties are so shaped and secured to the sphere that the line 12 connects the two end points. It will be noted that the sphere 10 need not be employed, and that only the strips 133 and 134 need to be mounted in their proper locations for rotation relative to a polar axis. If the gyrosyn compass is a magnetic north seeking compass and does not point to the true north pole, then mathematical corrections are to be made for this error, as well as for refraction, etc., as is understood by navigators, to plot the correct location of the end points of the curve 12. All corrections are made in the curve and not in the controls.

If the longitude and latitude of the starting point are known, then the arm 30 and courser 15 may be set by slipping their friction drives, as may be suitably provided, so that the light point 96 strikes the sphere at that known location. This may require slipping the sphere polar axle 35 relative to its clutch drive 37 so that the sphere will rotate in a correct time relationship with the position of the sun at Denver. This corrects for longitude, and the chronometer needs merely to drive the sphere or plates 133 and 134. If the longitude is know known, this may be determined by comparing a chronometer running on Greenwich standard time with the solar time of the starting point. Denver time is 7 hours later than Greenwich time. Latitude correction is accomplished automatically by the electronic hunting device, provided the tube 14 has been angularly adjusted for the declination of the sun, and particularly for the time of arrival at the destination. If desired, this may be effected automatically by means of a chronometer driven cam having a sine curve shaped to tilt the tube as required to compensate for the annual variation. It is however preferred that this correction be made manually, since the declination varies to an immaterial amount during a short trip. After the chronometer 11 has been started, the sphere 10 will rotate with the sun movement and the pilot tube 14 will seek and follow the sun throughout the day, with the light spot 96 remaining at the correct latitude and longitude while the craft is moving or stationary. The same considerations apply if a sidereal fix is employed.

It is not necessary to know the latitude of the starting position, since the sphere axis and the courser are correctly positioned for the latitude of Denver 40° N. by the automatic movement of the supporting arm 30, provided the arm 21 is maintained east and west by the gyrosyn compass. The motor 55 tilts the arm 30 when it is energized by activation of the north or south cathodes of the pilot tube, first by the outside cells 80 and 82 and ultimately by the inner cells 61 and 63. That is, the sphere axis is automatically tilted by the electronic controls that are activated when the pilot tube itself seeks to align its center line with a ray of sunlight. Likewise, the longitude position of the half circle arm 45 is automatically determined by the other cells of the pilot tube energizing the longitude motor 52. The photocells are sensitive to infrared light so that if the day is cloudy, the cells will be activated by the light that penetrates the clouds or rain or snow. The courser 15 is moved along the arm 45 by any unbalance of the bridge circuit (Fig. 9) caused by an angular change of position of the arm 30, so that the courser is so positioned that its light pencil 96 points to the latitude of craft position. It will benoted that this construction does not depend on a gyro compass to tilt the sphere axis, and that this is done automatically by the electronic pilot tube controls. The gyrosyn compass is merely required to hold arm 21 in an east-west position, and errors in that positioning are corrected in the plotting of the curve 12.

When the craft takes off from D to S in a generally southeast direction, (Fig. 1) any material change of latitude and longitude may cause the light spot 96 to deviate from the black line 12 and so activate the photosensitive element 138. If the indicated craft position is north of the line 12, the light pencil 96 will strike the surface 133 of high reflectivity and cause a high activation of the cathode 138, whereby sufficient current is developed to close the circuit of the relay 143. This causes the associated battery or other source of power to actuate the small D. C. motor 130 in such a rotative direction as to result in the craft rudder being turned to bring the craft back towards the south. A south deviation results in the craft moving more to the north. Suitable constructions are to be employed to prevent the rudder from being turned too far and to insure only a small angular change of direction of the craft. Thus the electronic apparatus governed by the photosensitive element 138 will hunt back and forth until the craft is brought on course and held there. If the light pencil contacts only with the black line 12, then the craft rudder is not actuated but is held stationary. It will be understood that this relates to the over all control of the lateral movement of the craft and that other stabilizing and control mechanisms may be employed to take care of minor changes in direction of the craft and to hold it steady. The control of the rudder by the mechanism herein described is superimposed upon the other rudder controls.

Since the craft is moving easterly, the arm 45 is revolved westerly about the sphere axis faster than the sphere 10 rotates, and the position of the arm relative to the sphere continues to give the instantaneous longitude position. The latitude position is obtained by the automatic movement of the courser 15 by the Wheatstone bridge control mechanism of Fig. 9. Thus, any deviation of the position determined by the electronic control mechanism from the position determined by the curve 12 results in changing the craft course to follow the course line 12, even if that line has been incorrectly plotted. But errors in that line become immaterial or are non-critical if the destination is exactly plotted. Also, by using enlarged segments 133 and 134 and making necessary corrections therefor, one may obtain a reasonable accuracy in finding the destination. As the craft proceeds southerly and reaches positions of lower latitude, the sphere axis gradually approaches a horizontal position so that when the craft crosses the equator, the sphere axis will be horizontal and the plane of the equator of the sphere will pass through the zenith with the courser positioned on that line in such east or west location as is determined by the time of day. The sphere axis continues to tilt with the south pole moving upwardly and the craft guidance continues automatically.

It will be appreciated that various modifications may be made in this construction within the scope of my invention, and the above disclosure is to be interpreted as setting forth the principles and preferred embodiments thereof without imposing limitations on the appended claims.

I claim:

1. A navigating instrument for craft comprising a chart having the latitude and longitude of a destination plotted thereon, a course follower movable relative to the chart, an electronic device which is automatically controlled by radiant energy directed from and movable to maintain a fix on a celestial body during the craft movement, and means governed by variations in movement of said device as it maintains said fix which moves the course follower to a position related to the instantaneous latitude and longitude of the craft position.

2. A navigating instrument for craft comprising a chart having plotted thereon the latitude and longitude of a destination and a line connecting the destination with a starting point, a course follower movable over the chart, an electronic device which is automatically controlled by radiant energy from a celestial body, mechanism governed by said device which causes the device to hunt for and to maintain a fix on the celestial body during the craft movement, and electrical mechanism controlled by movement of the device in maintaining said fix which moves the course follower over the chart to a position related to the instantaneous latitude and longitude of the craft and indicates the craft position relative to the course line.

3. A navigation instrument for a craft having a rudder for guiding its lateral movement and apparatus for controlling the rudder comprising a chart having plotted thereon the latitude and longitude of and a course of non-critical shape to a destination, a course follower mounted for movement relative to the plotted course, a light seeking electronic device which is automatically controlled by direct radiant energy from and movable to maintain a fix on a celestial body during the craft movement, means controlled by movement of the device which causes the course follower to move relative to the course substantially in accordance with the actual path of the craft and electrical apparatus controlled by the position of the course follower relative to the charted course which governs said rudder apparatus.

4. A navigating instrument for a craft which is to proceed to a given destination comprising a chart having plotted thereon the latitude and longitude positions of said destination, a follower movable over the chart relative to said destination, an equatorially mounted electronic device on the craft activated by light from a celestial body, electrical mechanism controlled by the activation of said device which causes the device to move angularly and automatically maintain a fix on the body as the craft moves and electrically operated mechanism responsive to the angular movement of the device in maintaining said fix which move the follower relative to the chart in accordance with the instantaneous latitude and longitude positions of the craft.

5. An instrument according to claim 4 in which the electronic device comprises a light tube, a set of inner light activated elements within the tube and a set of outer light activated elements outside of the tube, and comprising electrical mechanism initially governed by the elements outside of the tube which causes the tube to hunt for and find the light from the celestial body and thereafter governed by the inner elements so that the electronic device hunts for and maintains a celestial fix.

6. A navigating apparatus for craft comprising a chart having a course of non-critical shape to a destination plotted thereon, an angularly movable electronic device activated by radiant energy from a celestial body, electrically operated mechanism controlled by the activation which automatically moves the device angularly to maintain a celestial fix on said body, craft guidance apparatus, a course follower which is movable relative to the charted course, means controlled by angular movement of said device which moves the follower relative to the chart to a position which corresponds with the instantaneous craft position, and mechanism controlled by a deviation of the follower from the plotted course which governs the craft guidance apparatus so as to decrease that deviation.

7. A navigating instrument for craft comprising a light seeking electronic light activated device which is revoluble about an axis in a north and south plane, a universally mounted sphere having latitude and longitude markings and providing a charted course which is revoluble coaxially with the device, mechanism to revolve the sphere in an east to west direction at the angular rate of earth rotation, means governed by activation of the electronic device to tilt the axis of revolution of the sphere and the device and to swing the device about said axis so as to maintain the device aligned with a ray of light from a celestial body, a course follower movable over the chart and means governed by the tilting of said axis and the swinging movement of the device relative to the chart which positions the course follower relative to the sphere markings in accordance with the craft position.

8. Apparatus according to claim 7 comprising craft guidance apparatus and electrical control mechanism therefor governed by the course follower in accordance with a deviation of the follower from said plotted course.

9. A navigating instrument for a moving craft comprising an equatorially mounted electronic light seeking device which is responsive to radiant energy from a celestial body, means including a magnetic pole seeking compass which orients the device angularly so that it may revolve about an axis substantially parallel with the earth axis, mechanism governed by activation of the device which causes it to maintain a fix on said body, a chart having a destination plotted thereon with reference to latitude and longitude and corrected for magnetic declination from the true north and south, a course follower, and means governed by said device which locates the follower with reference to the charted destination as an uncorrected instantaneous position of the craft, whereby as the craft approaches the destination the error due to magnetic declination decreases to a minimum.

10. A navigating instrument according to claim 9 in which a course to the destination is plotted on the chart comprising craft guidance apparatus and electrical mechanism controlled by a deviation of the course follower from the plotted course which causes said apparatus to guide the craft in a direction which decreases said deviation.

11. A navigating instrument for craft comprising a universally mounted sphere providing a chart having a course plotted thereon, means to maintain the sphere axis in a north south plane, a pilot tube revoluble about the sphere axis which has an electronic device activated by light from a celestial body, means governed by said device which automatically maintains the tube aligned with said light as the craft moves, means for rotating the sphere about the sphere axis in an east to west direction at the apparent rate of movement of the celestial body, a course follower movable over the chart, and electrical apparatus controlled by the movement of said pilot tube in maintaining its fix which positions the course follower relative to the chart in accordance with the instantaneous latitude and longitude of the craft.

12. A navigating apparatus for craft comprising a universally mounted sphere providing a chart having a course plotted thereon, means for rotating the chart about the sphere axis in the apparent direction of and at the rate of movement of a celestial body used as a fix, a pilot tube having an electronic device activated by light from said fix, means governed by said device which maintains the pilot tube aligned with said light, means governed by the device which maintains the sphere axis substantially parallel with the earth's axis, a course follower movable relative to the chart and electrical apparatus controlled by movement of the pilot tube relative to the chart as caused by the craft movement which positions the course follower to give an instantaneous determination of the approximate craft location.

13. A navigation instrument for craft comprising a sphere having a chart thereon, a mount for rotating the sphere about its axis and for tilting the axis relative to the earth axis, means for rotating the sphere in an east to west direction at the apparent angular rate of movement of a celestial body, a pilot tube having an electronic light pick-up device mounted to swing about the sphere axis and to be tilted by movement of said axis, said device being activated by a ray of light from said body, means governed by said device for moving it and the sphere so as to maintain a fix on the celestial body, a course follower mounted to swing with the pilot tube and to move laterally relative thereto, electrical mechanism controlled by the motion of the pilot tube to maintain a fix which tilts the sphere axis into parallelism with the earth axis and swings the pilot tube to maintain the fix, and means governed by the sphere tilting which moves the course follower over the chart in accordance with the position of the craft.

14. A navigating instrument for craft comprising a sphere providing a chart having a destination plotted thereon, supports for revolving the sphere about its axis and for tilting the axis, means for holding the axis substantially in a north and south plane, a light sensitive device mounted to swing about the sphere axis and to be tilted therewith, means for rotating the sphere about its axis at the angular rate and in the apparent direction of movement of a celestial body, means governed by said device for swinging it and tilting the sphere axis to maintain the device fixed on said body, a course follower movable relative to the revolving chart at the angular rate of swinging of said device and electrical mechanism controlled by the tilting of the sphere axis to maintain said fix which moves the course follower in an axial plane, so that the follower position is related to the craft position and the destination.

15. A navigating instrument according to claim 14 for a craft having rudder control apparatus comprising electrical mechanism governing said apparatus which operates when the follower is off the plotted course to move the craft in that direction which moves the follower towards the plotted course.

16. A navigating instrument according to claim 14 for craft having rudder control apparatus comprising a chart having a course plotted thereon, a course follower movable over the charted course and mechanism governed by a deviation of the follower from the course which causes the rudder control apparatus to steer the craft in a direction which returns the follower towards the course.

17. A navigating instrument according to claim 14 for a craft having rudder control apparatus comprising a chart having a course plotted thereon, a course follower, mechanism which positions the follower relative to the chart according to the instantaneous craft position and mechanism governed by a deviation of the follower from the course which causes the rudder control apparatus to steer the craft in a direction which returns the follower towards the course.

18. A navigating instrument for a craft comprising a chart having a course plotted thereon which is defined by surfaces of different light reflecting characteristics, a course follower movable over the course which directs a ray of light onto the chart, an electronic light seeking device which is automatically controlled by radiant energy directed from and movable to maintain a fix on a celestial body during the craft movement, mechanism controlled by movement of said device which positions the follower automatically according to the instantaneous craft position, an electronic device including a photosensitive element activated differentially by light reflected from said surfaces and electrical apparatus governed by said device in accordance with the position of the follower light ray relative to the course defined by said surfaces.

19. A navigating instrument according to claim 18 for a craft having rudder control apparatus in which the electrical apparatus governed by the electronic device is connected to control the rudder and move the craft towards the charted course.

20. A navigating apparatus comprising an equatorially mounted electronic light seeking device, electrical mechanism governed by activation of said device which automatically moves it to maintain a fix on a celestial body, a chart providing a plotted course of non-critical shape which is defined by two surfaces of different light reflective qualities, a course follower movable over the chart which directs a ray of light thereon, means governed by a variation in movement of said device when the craft is moving as compared with stationary craft conditions which moves the follower relative to the charted course according to the instantaneous craft position, an electronic device including a photo cell activated differentially by light reflected from said surfaces and electrical control apparatus governed by the electronic device in accordance with a variation of position of the light ray relative to the course.

21. A navigating instrument for craft comprising a rotatable sphere having the latitude and longitude of a destination plotted thereon, means providing a universal mount for the sphere, means to rotate the sphere at the angular rate of earth rotation, an arcuate arm revoluble about the axis of and close to the sphere, an electronic light seeking device mounted on the arm which is activated by direct radiation from a celestial body, electrical mechanism governed by said device which causes the latter to maintain a fix on said body by tilting the sphere and revolving the arm, a courser movable along said arm, and means governed by tilting movement of the sphere which causes the courser to move along the arm in accordance with a variation in latitude position of the craft.

22. An instrument according to claim 21 comprising light reflective surfaces on the chart defining a course to a destination, a light on the courser directed towards the plotted course, an electronic device which is differentially activated by the light reflected from said surfaces, craft guidance mechanism and means controlled by the differentially activated electronic device which governs the craft guidance mechanism and causes the craft to move according to the plotted course.

23. A navigating instrument for craft having craft guidance apparatus comprising an equatorially mounted light seeking electronic device which is automatically controlled by the radiant energy directed from and movable to maintain a fix on a celestial body during the craft movement, a chart having a course to a destination plotted thereon according to latitude and longitude and to correct for instrument errors but without being limited to a great circle, a course follower movable over the chart, latitude and longitude determining mechanism governed by said device which responds to changes in the latitude and longitude of the craft position, mechanism governed by the latitude and longitude determining mechanism while the electronic device maintains its fix which causes the course follower to move over the chart and to be positioned in accordance with the instantaneous latitude and longitude position of the craft, and electrical mechanism rendered operative by a deviation of the follower from the plotted course which governs the craft guidance apparatus and causes the craft to approach and substantially follow the course.

ROBERT J. HERBOLD.

REFERENCES CITED

The following references are of record in the file of this patent:

UNITED STATES PATENTS

| Number | Name | Date |
|---|---|---|
| 1,016,240 | Alexieff | Jan. 30, 1912 |
| 2,102,512 | Chance | Dec. 14, 1937 |
| 2,155,402 | Clark | Apr. 25, 1939 |
| 2,354,917 | Jones | Aug. 1, 1944 |
| 2,419,641 | Hart | Apr. 29, 1947 |
| 2,424,193 | Rost et al. | July 15, 1947 |
| 2,444,933 | Jasperson | July 13, 1948 |